(12) United States Patent
Djeddah

(10) Patent No.: US 6,395,985 B1
(45) Date of Patent: May 28, 2002

(54) SEALED ELECTRICAL TERMINAL WITH ANTI-ROTATION LOCKING SYSTEM

(75) Inventor: Jacques Lucien Djeddah, Sceaux (FR)

(73) Assignee: SAPCO, Courbevoie (FR)

( * ) Notice: Subject to any disclaimer, the term of this patent is extended or adjusted under 35 U.S.C. 154(b) by 0 days.

(21) Appl. No.: 09/717,416

(22) Filed: Nov. 21, 2000

(30) Foreign Application Priority Data

Nov. 23, 1999 (FR) .............................................. 99 14713
Jun. 28, 2000 (FR) .............................................. 00 08331

(51) Int. Cl.$^7$ ................................................ H02G 3/02
(52) U.S. Cl. ...................................... 174/59; 174/65 R
(58) Field of Search ................................ 174/59, 65 R, 174/61, 142, 152 G, 195, 152 R, 153 R; 285/222, 222.1–222.5, 223; 403/259, 195, 197, 201

(56) References Cited

U.S. PATENT DOCUMENTS

| | | | |
|---|---|---|---|
| 2,412,259 A | | 12/1946 | Graves, Jr. |
| 3,984,132 A | * | 10/1976 | Sarson ........................ 285/222 |
| 4,355,920 A | * | 10/1982 | Graham ....................... 403/195 |
| 4,828,296 A | * | 5/1989 | Medvick ....................... 285/168 |
| 5,405,172 A | * | 4/1995 | Mullen, Jr. .................... 285/92 |
| 5,623,125 A | * | 4/1997 | Pioch ........................ 174/152 R |

FOREIGN PATENT DOCUMENTS

DE            33 08 332 A1      9/1984

* cited by examiner

*Primary Examiner*—Dean A. Reichard
*Assistant Examiner*—Angel R. Estrada
(74) *Attorney, Agent, or Firm*—Scully, Scott, Murphy & Presser

(57) ABSTRACT

A sealed electrical terminal for a high-power machine, wherein the terminal includes cylindrical central rod (10) made of metal. The rod is provided at opposite ends with threaded portions (14, 16), to which there may be fastened, respectively, and end of a cable (55) extending from a power supply and an end of the coil (59) of the motor. The terminal includes at last one tubular insulating body (20, 30) fitted around the central rod, and a metal tubular cap (32) which is arranged around the at least one body and which are crimped onto the at least one body. A seal (28) is provided in order to effect a sealing between the at least one insulating body and the cap.

19 Claims, 4 Drawing Sheets

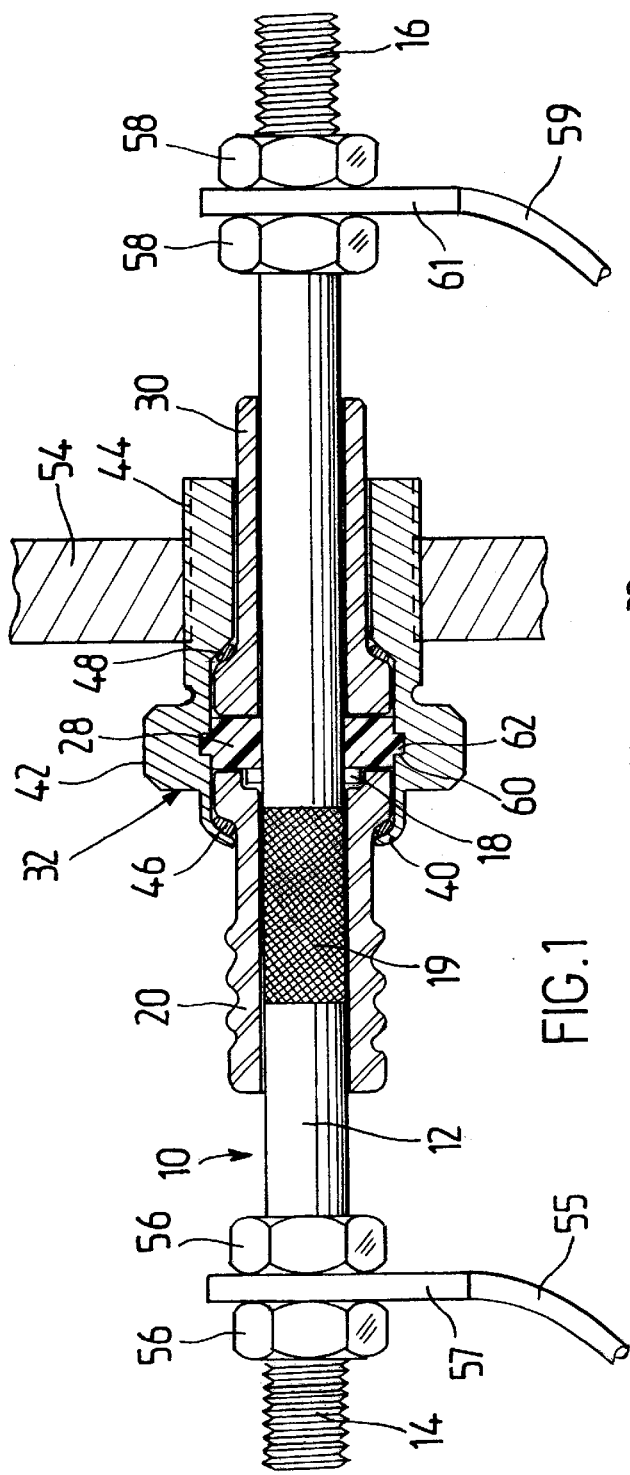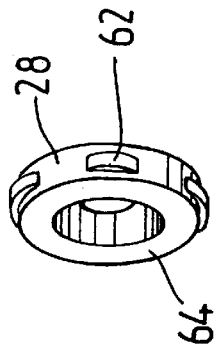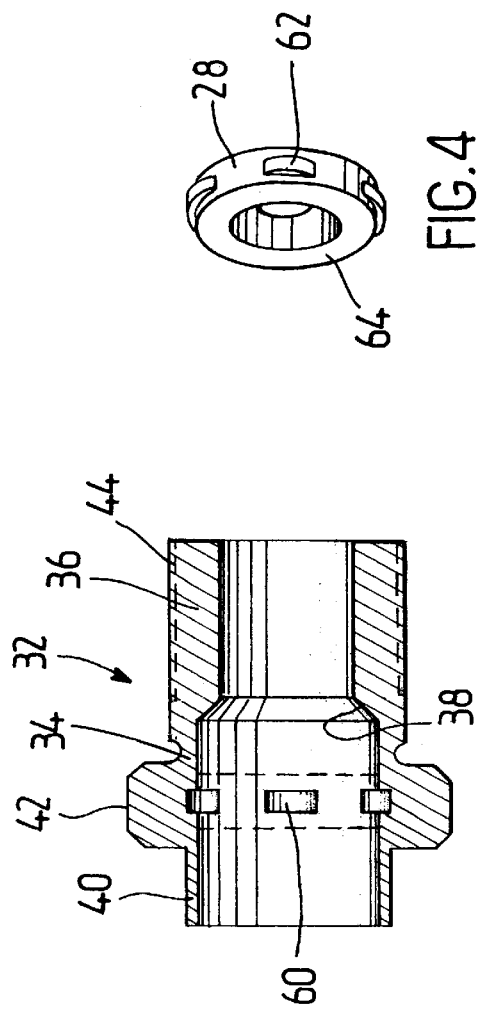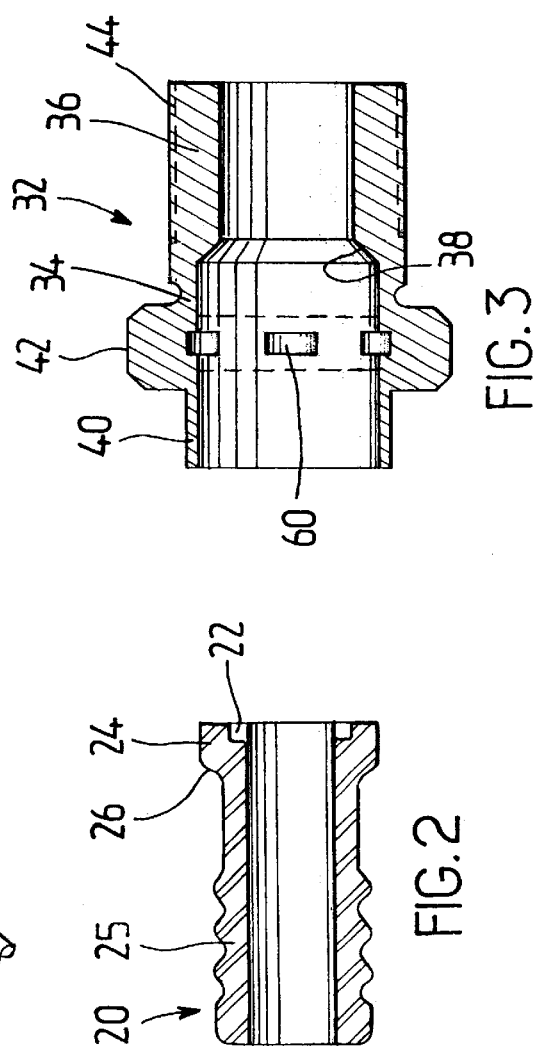

SEALED ELECTRICAL TERMINAL WITH ANTI-ROTATION LOCKING SYSTEM

FIELD OF THE INVENTION

The present invention relates to improvements made to sealed electrical terminals, also called in the art bulkhead fittings or bushings. These bushings are commonly used for feeding a high-intensity medium-voltage current to large electrical machines, and especially to the motors of high- and medium-power refrigerating units.

In the particular application to refrigerating units, the bushings must be absolutely sealed since the motors of these units are cooled by a fraction of the refrigerant, such as freon or a chlorofluorocarbon, and they must therefore bar the way to these fluids which are excessively quick to escape.

PRIOR ART

The sealed bushings of the prior art generally comprise a cylindrical central rod made of metal, such as copper, provided at its ends with threaded portions, to which may be fastened, respectively, the end of a cable coming from a power supply and the end of the coil of the motor which is located inside the metal casing of the motor, at least one insulating tubular body, for example made of ceramic, fitted around the central rod, and a metal tubular cap which is slipped around the insulating body or bodies and is crimped onto this or these insulating bodies, at least one seal being provided in order to seal between the insulating body or bodies and the cap.

The body has, on its outer wall, a threaded portion by means of which the bushing can be screwed into the wall of the casing of the motor and a portion in the form of a nut for driving the bushing when screwing it into the wall.

There are currently on the market two types of sealed bushings: bushings with two insulating bodies and bushings with a single insulating body.

1. In the bushings of the first type, the two insulating bodies are slipped around the central rod, respectively from the ends thereof, an insert seal of cylindrical shape and made of a deformable material, generally Teflon, being interposed between the adjacent ends of the two insulating bodies. The two other ends of the rod project from the ends of the insulating bodies. Each of the insulating bodies has a cylindrical head portion of larger diameter and a cylindrical shank portion of smaller diameter, these two portions being joined together by an annular shoulder. As regards the cap, this has a stepped inner wall complementary to that of the two insulating bodies and it terminates in a tubular crimping portion which can be crimped onto these bodies. Under the action of the axial compressive force that the two insulating bodies exert on the Teflon seal when crimping the cap, the insert seal expands radially so that its inner and outer cylindrical walls are applied very intimately against the outer wall of the central rod and against the inner wall of the cap. Thus, excellent sealing is achieved, on the one hand, between the insulating bodies and the central rod and, on the other hand, between the insulating bodies and the cap.

2. In the bushings of the second type, the single insulating body has a cylindrical portion of large diameter, to which an O-ring seal is fastened, and, on each side of said cylindrical portion of large diameter, two cylindrical portions of smaller diameter. In this type of bushing, the central rod projects from only one end of the insulating body, while its other end is housed at the bottom of a deep recess formed in the other end of the insulating body. The cap has the same structure as in the previous case.

A sealed bushing, whether of the first or of the second type described above, is fastened to the metal casing of the motor by screwing the cap into a tapped hole in the casing and then by connecting the ends of the supply cable and of the coil of the motor to the threaded ends of the central rod. For this purpose, the cable and the coil are provided at their free end with lugs which are clamped tightly between two nuts screwed onto the threaded portions of the central rod.

It is when exerting a clamping torque on the nuts, on the outside as on the inside of the casing, that the risk arises of the central rod starting to rotate with respect to the cap, thereby entraining with it the insulating body or bodies and the seal or seals integral with the rod. It is true that this inopportune rotation of the central components of the bushing in the cap does not necessarily impair the sealing of the bushing, since the seals remain in tight contact with the surface of the central rod and with the inner surface of the cap, but it represents a source of worry to the operator responsible for the connection, who wonders whether he has destroyed the essential absolute sealing characteristics of the bushing.

The aim of the present invention is to remedy this drawback and the object of the invention is to provide both types of bushings of the prior art with a certain number of improvements by means of which the central rod, and the insulating body or bodies and the seal or seals which are integral therewith, are prevented from rotating inside the cap, even if an inordinate torque is applied to the nuts for clamping the lugs.

SUMMARY OF THE INVENTION

For this purpose, the present invention provides a sealed bulkhead bushing of the type described above, which is characterized in that the central rod, the insulating tubular body or bodies, the seal and the cap have, on their mutual contact regions, components or portions having complementary reliefs, which are discontinuous or irregular, in the circumferential direction, said reliefs being capable of fitting one into another when crimping the cap onto the tubular insulating body or bodies, thus rotationally locking the latter with respect to the cap and to the central rod.

The reliefs which prevent the cap from rotating with respect to the insulating tubular bodies may be made in various ways.

According to one particular embodiment of the invention, applied to the first type of bushing described above, these reliefs consist of notches formed in that inner wall of the cap which is in contact with the cylindrical wall of the insert seal.

When crimping the cap, the material of the insert seal creeps and fills said notches, so that ribs of complementary shape to that of the notches are formed on the cylindrical wall of the insert seal. These ribs, when engaged with the notches, prevent the central rod and the seal from rotating with respect to the cap.

According to a second embodiment of the invention, applied to the second type of bushing described above, the anti-rotation locking is obtained by means of the combination of the following characteristics:

between the central portion of larger outside diameter of the insulating body and one of the end portions of smaller outside diameter of the insulating body there is a cylindrical bearing surface of diameter lying between that of the central portion of larger diameter and that of said end portion;

the cap has a stepped inner profile of complementary shape to that of the insulating body and includes, in particular, a bore of intermediate diameter which fits around the cylindrical bearing surface of the insulating body;

provided on the cylindrical bearing surface of the insulating body is at least one recess into which is partially inserted a removable locking component, part of which projects radially out of the recess without, however, going beyond the level of the cylindrical wall of the central portion of larger outside diameter;

said bore of the cap has at least one U-shaped longitudinal notch of depth at least equal to the height by which the locking component projects from the recess.

The locking component may consist of a ball or of a key. In the first case, the recess consists of a hemispherical blind hole which houses half of the volume of the ball, and in the second case, the recess consists of a longitudinal slot extending over the entire length of the cylindrical bearing surface.

By means of this arrangement, the cap can be slipped around the insulating body without the projecting portion of the ball or of the key scoring the inner surface of the cap.

As explained above, in a sealed bushing according to the first type, the axial and rotational locking of the central rod with respect to the insulating tubular bodies is achieved by clamping the insert seal against the central rod. This locking may be reinforced in various ways. For example, the central rod may include two diametrically opposed projections which act as axial stops and which are housed in notches formed in the inner wall of the insulating tubular bodies. The central rod may also include knurled portions on the parts which lie inside the tubular bodies and, in addition, the rod portions which lie inside the tubular bodies, including the knurled portions, may be coated with adhesive.

These various methods of anchoring the insulating bodies to the central rod, which use knurlings, projections and adhesive, have a certain number of drawbacks. Thus, if the bulkhead bushing is exposed to a relatively high temperature, the metal rod expands greatly. Given that the gap between the rod and the tubular insulating body is filled with adhesive, there is no longer any space available to absorb this expansion. The tubular insulating body therefore fully takes the radial rod expansion forces and ends up splitting.

In addition, the transfer of the torsional couple of the metal rod to the tubular insulating body is quite poorly provided by the projections and by the adhesive, given that a function of said projections is merely to act as a stop, ensuring that the bonding is carried out up to the desired height.

Furthermore, the adhesive may deteriorate over time, naturally or due to the action of chemicals.

The invention provides another way of anchoring the insulating bodies to the central rod, which requires neither the formation of projections and knurling, nor the use of adhesive.

According to the invention, the anchoring is provided by at least one removable linking component having a portion which is inserted into a housing cut into the metal rod and a portion which is inserted into at least one axial housing formed in the inner wall of the tubular insulating body.

Several linking components may be used to provide this anchoring, for example two diametrically opposed linking components on the metal rod, or three linking components arranged at 120° one with respect to another, or even four linking components arranged at 90° one with respect to another, etc.

Each linking component may consist of a ball, a pin or a key.

By using the linking components, it is even possible to leave a non-zero gap free between the central rod and the tubular insulating bodies in order to allow the rod to expand freely when the bushing is exposed to a high temperature. In this case, the central rod will exert a radially outward thrust on the insulating bodies only at the points of contact of the linking components with the insulating bodies. These points of contact are limited in number (one, two, three or four) and lie precisely in regions in which the wall of the insulating bodies is the thickest and not over the entire length of the insulating body as was the case when the rod was adhesively bonded to the insulating bodies. Destruction of the insulating bodies is thus avoided.

Another advantage stems from the fact that the torsional moment obtained using a few linking components is much higher than that obtained with the knurling and adhesive bonding (1.5 to 2.5 times greater).

BRIEF DESCRIPTION OF THE DRAWINGS

Several preferred embodiments according to the invention will now be described in detail, but solely by way of examples, with regard to the appended drawings in which:

FIG. 1 is a longitudinal sectional view of a bulkhead bushing according to a first embodiment of the invention, comprising two insulating tubular bodies;

FIG. 2 is a sectional view of one of the insulating tubular bodies;

FIG. 3 is a longitudinal sectional view of the cap before it is crimped, showing, on the inner wall of the cap, circularly arcuate notches;

FIG. 4 is a perspective view of the insert seal which has been deformed after the cap has been crimped;

DETAILED DESCRIPTION OF PREFERRED EMBODIMENTS

Figure 5:
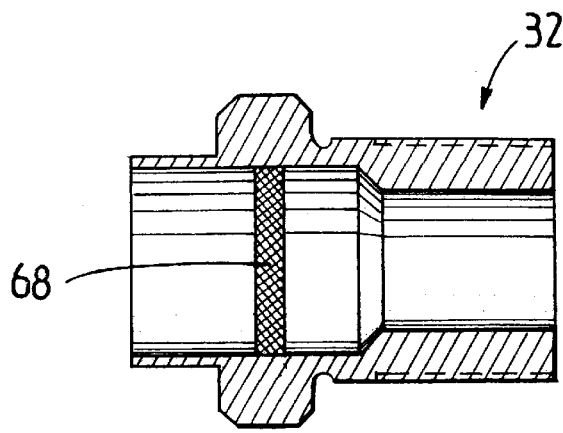
FIG. 5 is a longitudinal sectional view of a cap showing another type of relief on its inner wall.

The bulkhead bushing shown in FIG. 1 comprises a cylindrical rod 10 made of metal, for example copper, having a central portion 12 with a smooth surface and two threaded end portions 14, 16. The rod has, in its smooth portion, two diametrically opposed projections or lugs 18 acting as axial stops. It also includes, on one side of the projections 18 or on both sides, one or two knurled portions 19.

Slipped around the rod from one of its ends is a first insulating tubular body 20 made of an electrically insulating material, for example a ceramic or a plastic, which has a cylindrical head portion 24 (FIG. 2) of larger diameter and a cylindrical shank portion 25 of smaller diameter, these two portions being joined by an annular shoulder 26. The insulating tubular body 20 has, on the inner edge of its head end, two diametrically opposed notches 22 in which the projections 18 are housed.

An insert seal 28, consisting of a cylindrical washer made of insulating, rigid but deformable material, for example Teflon, is fitted from the other end of the rod 10. The insert seal 28 is initially cylindrical and has an inside diameter approximately equal to the diameter of the rod, an outside diameter approximately equal to that of the head portion 24 and two flat end faces approximately perpendicular to the axis of the seal.

Slipped over the rod after the insert seal 28 is a second insulating tubular body 30 which is more or less identical to the body 20. The insulating body 30 is placed so that its head portion faces toward that of the first insulating body 20.

A ring-shaped tubular metal cap 32, with a stepped bore, is slipped on, again from said other end of the rod 10. As shown in FIG. 3, the cap has a tubular first portion 34 of inside diameter approximately equal to the diameter of the head portion 24 of the insulating bodies and a second tubular portion 36 of inside diameter approximately equal to the diameter of the shank portion 25 of the insulating bodies, these two bores being joined by an annular shoulder 38. The first portion 34 has a length approximately equal to the total length of the two head portions and of the insert seal when they are juxtaposed against each other. This portion is extended by a tubular crimping portion 40 and has, on its outer wall, a part 42 in the form of a hexagonal nut manufactured as one piece with the cap 32. The second portion 36 has, on its outer wall, a thread 44 which is used to fasten the bushing through the frame of the electrical machine.

According to the invention, the cap 32 has, on its inner wall, in the section which is intended to be in contact with the cylindrical wall of the insert seal 28, at least one circularly arcuate notch 60. The embodiment shown in FIG. 3 has four notches angularly offset by 90°. These notches may be produced by any suitable technical means, for example using a milling cutter of suitable diameter and thickness.

The bulkhead bushing is assembled as follows: firstly, the rod and in particular the knurled portions 19 are coated with an adhesive, and then the insulating bodies 20 and 30, the insert seal 28 and the cap 32 are slipped onto the rod 10, as described above. Metal seals 46, 43 are inserted at the rear of the head portions of the insulating bodies 20, 30, respectively. The bushing is then in the state shown in FIG. 1. Next, the annular crimping portion 40 is crimped onto the shoulder 26 of the insulating body 20 so as to keep all the components of the bushing compressed. Under the action of the axial compressive force developed during the crimping, the insert seal 28 is compressed on its two lateral faces 64 (FIG. 4) by the two insulating tubular bodies 20 and 30 and it expands radially outward so as to fill the notches 60 in the cap which lie around its periphery. Ribs 62 are formed around its periphery, these ribs having a shape complementary to that of the notches. These ribs mate with the notches so as to prevent the insert seal from rotating with respect to the cap. The seal also expands radially inward and is applied very firmly against the wall of the rod 10. This results in the rod also being axially and rotationally locked with respect to the cap.

The bulkhead bushing thus assembled is ready to be used. The bushing is fastened through the metal frame 54 of the electrical machine by screwing the threaded portion 44 of the cap 32 into a tapped hole drilled in the frame. This operation is assisted by using a spanner which engages with the nut-forming portion 42. Next, the end of a current supply conductor 52 and the end of a winding 59 of the electrical machine are connected to the rod 10, the connections being made by clamping the lugs 57, 61 fastened, respectively, to said ends between nuts 56, 56 and 58, 58 screwed onto the threaded portions 14, 16 of the rod. Because of the imbrication between the ribs 62 of the insert seal and the notches 60 of the cap, the inner components of the bushing do not rotate in the cap, even if an inordinate tightening torque is applied to the nuts 56, 58.

FIG. 5 shows another type of relief formed on the inner wall of the cap. This relief consists of a knurling 68 produced in that region of the cap which is in contact with the insert seal. However, given that the formation of a knurling has the effect of raising the level of this surface with respect to its initial surface and that, in the present case, this raising is not desirable, since it would prevent the introduction of the insulating tubular bodies and the insert seal into the cap, it is necessary to produce, before the knurling, an annular recess extending over the region to be knurled and then to knurl the bottom of this recess. The depth of the recess will be chosen so that, after knurling, the knurled surface 68 comes to the same level as the rest of the inner wall of the cap. Here too, the material of the insert seal will flow into the grooves of the knurled surface 68.

According to the invention, the axial and rotational locking may be further improved by producing on those end faces 70 of the insulating tubular bodies 20, 30 which are in contact with the insert seal 28, any noncircular relief, in the form of an indentation or a projection, this relief possibly being formed both in the middle of the end face 70 and along the inner edge or along the outer edge of said face.

Figure 6:
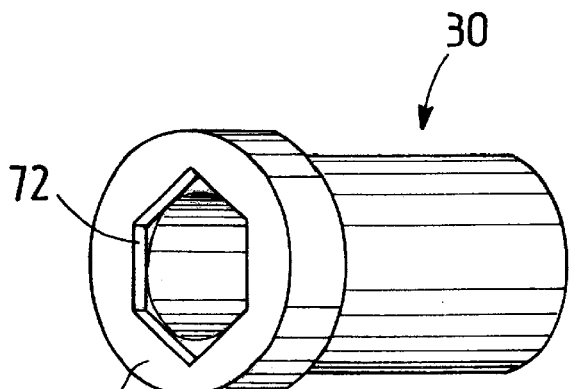
FIG. 6 is a perspective view of an insulating tubular body provided, at its end which is in contact with the insert seal, with a shallow recess having a hexagonal profile.
Figure 7:
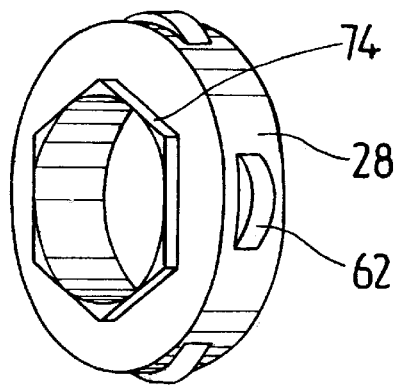
FIG. 7 is a perspective view of the insert seal after it has flowed into the recesses having a hexagonal profile which are formed at the adjacent ends of the two insulating tubular bodies in FIG. 6.

FIG. 6 shows one particular form of the relief. It consists of a shallow recess 72 having a hexagonal profile, formed near the inner edge of the insulating bodies. It will be understood that, when the bushing is crimped, the insert seal expands laterally and material from the seal will fill the recesses 72. Two projections 74 having a hexagonal outer profile are then formed on the Lateral faces of the seal, only one projection 74 being visible in FIG. 7. The projections 74 mate with the recesses 72 of complementary shape in order to prevent the insulating bodies from rotating with respect to the seal.

It goes without saying that the profile of the recess may be triangular, square or, more generally, polygonal. Moreover, instead of a recess it is possible to form, on the end faces 70 of the insulating bodies, a projection having any irregular profile, for example triangular, square, hexagonal or polygonal. In this case, these projections bite into the lateral faces of the insert seal and will imprint therein hollow impressions of complementary shape.

Figure 8:
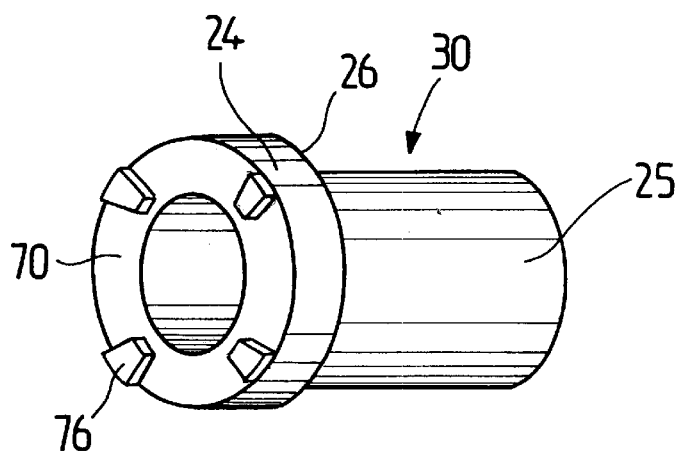
FIG. 8 is a perspective view of an insulating tubular body provided on its end face with projecting teeth.

It is also possible to form, on the end faces 70 of the insulating bodies, discontinuous reliefs, for example as crenellations, or else, as shown in FIG. 8, projecting teeth 76 or hollowed notches.

Several illustrative examples have just been described which make it possible to make the deformable seal 28, the cap, the insulating tubular bodies and the central rod to be made rotationally integral one with respect to another, but it is quite clear that the best locking between all these components will be achieved by forming both recesses 72 on the end faces of the insulating tubular bodies, notches 60 on the cap, and a knurling 62 on the rod.

Figure 9:
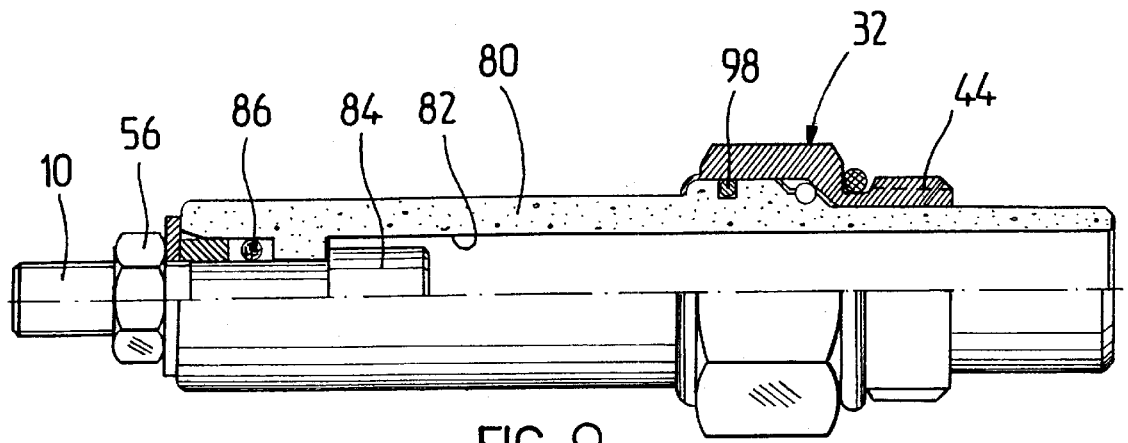
FIG. 9 is a longitudinal sectional view of a second embodiment of the bushing according to the invention, which comprises a single insulating tubular body.

Reference will now be made to FIG. 9 which shows a bulkhead bushing of the second abovementioned type.

This bushing comprises a single tubular body 80 made of ceramic. A deep recess 82, into which one end of the cylindrical rod 10 is inserted, is formed in this body, the other end being external to the insulating body. The inner end is provided with connection means 84 allowing the rod to be connected to the coil of the motor. As in the previous embodiment, the outer end of the rod is threaded and takes a nut 56 for clamping the lug of the power cable. A seal 86 seals between the rod and the insulating body.

Figure 10:
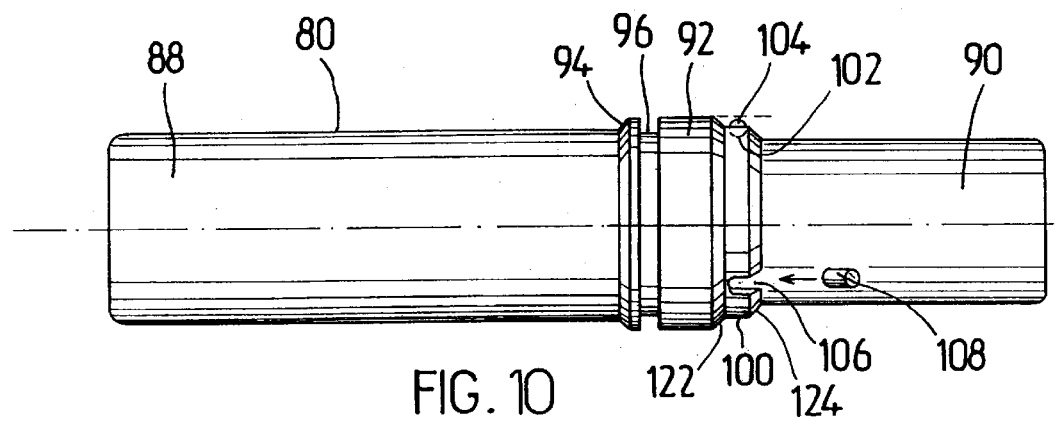
FIG. 10 is a side view of the insulating body of FIG. 9.

As shown in FIG. 10, the insulating tubular body 80 has two cylindrical end portions 88, 90 and a cylindrical central portion 92 of diameter greater than those of the end portions. The central portion 92 joins to the first end portion 88 by a shoulder 94 and has an annular groove 96 intended to house an O-ring seal 98 (FIG. 9).

Between the central portion 22 and the second end portion 90 there is a cylindrical bearing surface 100 of diameter between the diameter of the central portion and that of the second end portion.

Drilled into the bearing surface 100 are one or more recesses, such as hemispherical holes 102, each intended to house part of a ball 104, the other part projecting out of the hole. The diameter of the ball is chosen so that its projecting part lies below the level of the cylindrical wall of the central portion 92, as shown by the dashed line in FIG. 10.

Instead of the holes 102, it is possible to form, on the bearing surface 100, one or more U-shaped longitudinal notches 106 which open toward the second end portion 90. Inserted into the notches 106 are keys 108, part of which projects radially out of the notches without, however, reaching the level of the cylindrical wall of the central portion 92. The balls or the keys may be made of any hard material, for example metal, ceramic or even wood.

Figure 11:
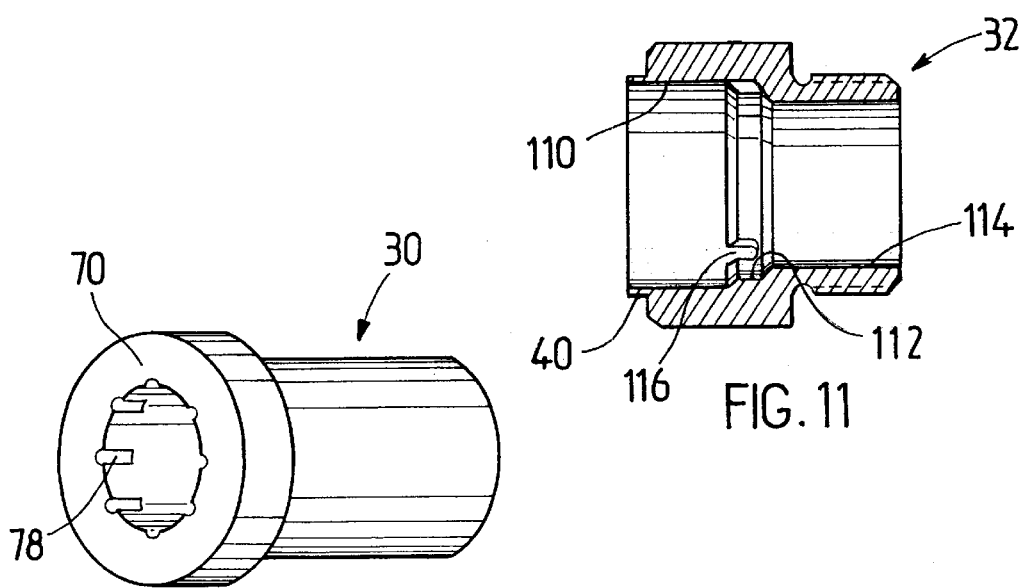
FIG. 11 is a longitudinal sectional view of the cap of FIG. 9, before it is crimped.

As shown in FIG. 11, the cap has a stepped inner profile, complementary to that of the central portion 92 and of the bearing surface 100. On its inner wall, it has a first bore 110 of diameter approximately equal to that of the central portion 92, a second bore 112 of diameter approximately equal to that of the bearing surface 100 and a third bore 114 of diameter approximately equal to that of the end portion 90. U-shaped longitudinal notches 116, which are open toward the first bore 110, are cut into the second bore 112.

The operation to assemble the bushing of FIG. 9 from the components shown in FIGS. 10 and 11 starts by placing the balls 104 or the keys 108 in the holes 102 and in the notches 106, and then the cap 32 is slipped onto the insulating body from the right-hand end of the latter, while orienting it angularly so that its notches 116 are axially aligned with the holes 102 or the notches 106 in the insulating body. The cap is slid on until it butts against the shoulders 122, 124 of the insulating body. During this movement, the balls 104 or the keys 108 are inserted into the notches 116 in the cap. Once the cap is in place, its deformable tubular end 40 behind the shoulder 94 of the widened portion is crimped.

The bushing is then in the state shown in FIG. 9. In this state, the insulating body is rotationally locked with respect to the cap because of the mechanical linkage formed by the balls or the keys in the notches.

Various linking means that can be used to prevent axial and rotational movement between the central rod and the insulating tubular bodies of the bushing will now be described in conjunction with FIGS. 12 to 16. To simplify the figures, only the central rod 12 and one of the insulating tubular bodies 20 have been shown.

Figure 12:
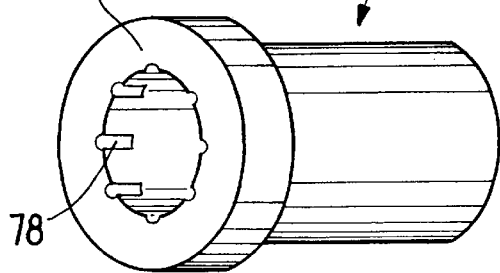
FIG. 12 is a perspective view of an insulating tubular body which has, on its inner wall, hollowed reliefs in the form of grooves which extend over a fraction of the length of the insulating body.

As shown in FIG. 12, it is possible to form longitudinal grooves 78, which are filled with adhesive, on those portions of the bore of the insulating bodies which are in contact with the knurled portions 19 of the rod 10. These grooves start from that end of the bore which lies on the same side as the head portion of the insulating body and extend over a fraction of the length thereof, that is to say they do not emerge at the other end. The adhesive thus achieves additional locking of the tubular bodies with respect to the rod.

Figure 13:
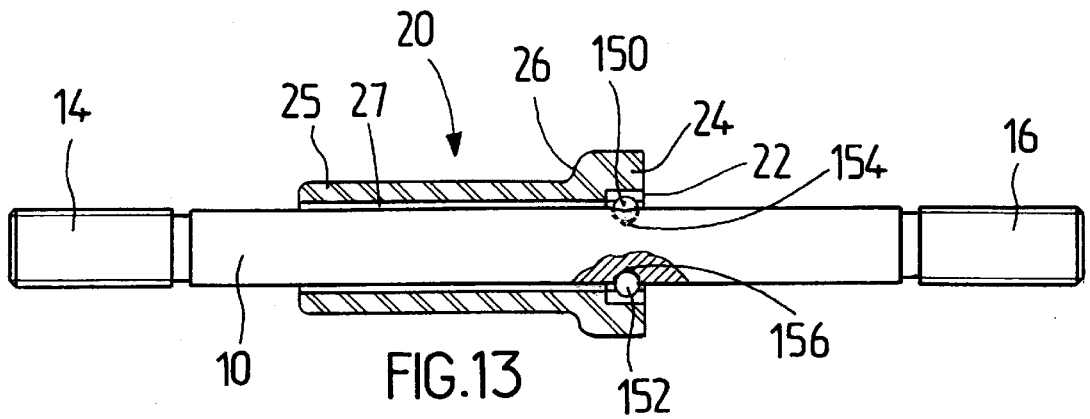
FIG. 13 shows one method of linking the central rod to the tubular insulating bodies by means of balls.

In the embodiment in FIG. 13, the linking components consist of two balls 150, 152 which are partially housed in two hemispherical blind holes 154, 156 drilled into the surface of the rod at diametrically opposed positions. The diameter and depth of the holes are chosen so that the balls have a portion which projects out of the holes. These portions are housed in diametrically opposed axial housings 22 formed in the inner wall of the insulating body 20 from its inner end. Of course, the same anchoring effect can be obtained by using one ball or more than two balls.

Figure 14:
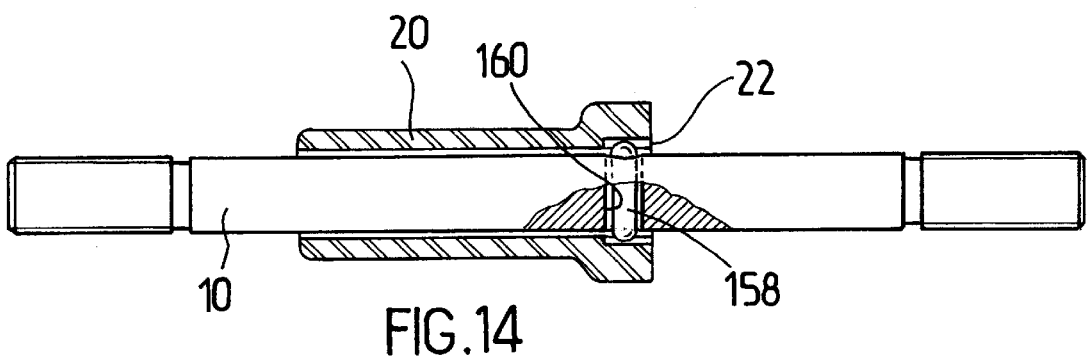
FIG. 14 shows another method of linking the central rod to one of the insulating bodies by means of a pin.

In the embodiment in FIG. 14, the anchoring is obtained by means of a pin 158 of length greater than the diameter of the central rod 10. This pin is inserted into a through-hole 160 drilled diametrically through the central rod so that its two end faces project on either side of the rod. These ends are housed in the axial housings 22 of the insulating body 20.

Figure 15:
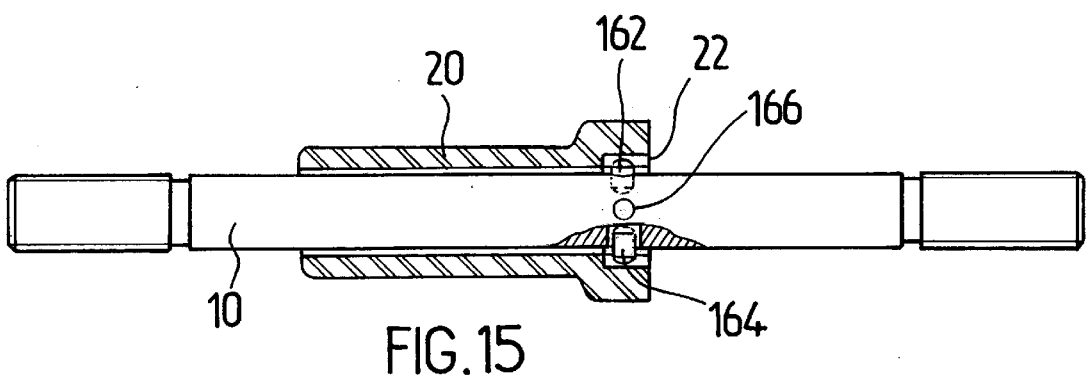
FIG. 15 shows yet another method of linking the central rod to an insulating tubular body by means of four short pins.

FIG. 15 shows another embodiment in which the anchoring is produced by means of four pins, only three of which, 162, 164 and 166, are visible in this figure. The pins have a length less than the radius of the central rod 10 and they are partially inserted into four blind holes drilled into the rod at 90° one with respect to another. These holes have a depth less than the length of the pins so that when the latter are inserted into the holes they have portions which project out of the holes and which are housed in four housings 22 formed in the inner wall of the insulating body 20. Here too, a single pin or again more than two pins may be used.

Figure 16:
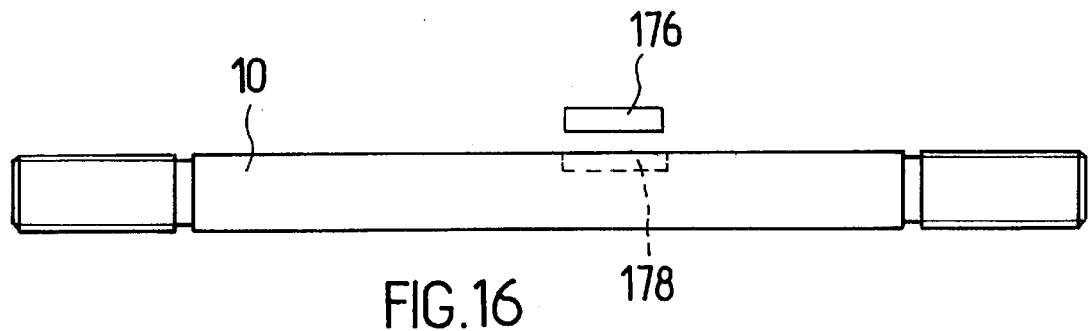
FIG. 16 shows another linking method by means of a key.

In the embodiment in FIG. 16, the anchoring is produced by means of one or more keys 176 having any suitable shape, for example a small flat plate of rectangular or hexagonal section. The key may also consist of a cylindrical rod portion. The key is inserted partially into a longitudinal slot 178, cut out in the surface of the rod in the longitudinal direction, and partially in an axial housing in the insulating body.

By using balls, pins and keys, the central rod can be perfectly smooth, and therefore without any projections or knurling. In addition, a non-zero gap 27 may remain between the insulating tubular bodies and the central rod, and it is not necessary to fill this gap with adhesive.

The balls, pins and keys may be made of any strong material, for example steel, stainless steel, plastic, ceramic, etc.

It goes without saying that it is possible to use balls, pins and keys all at the same time, their number and shapes being chosen in order to obtain the desired degree of anchoring.

Other embodiments of the linking components may be imagined, all falling within the scope of the concept of the invention.

What is claimed is:

1. A sealed electrical terminal for a large electrical machine; said electrical terminal comprising a metallic cylindrical central rod (10) having threaded portions (14, 16) at opposite ends thereof for fastening thereto, respectively, an end of a cable (55) extending from a power supply and an end of an electrical coil (59) of the electrical machine; at least one tubular insulating body (20, 30; 80) being fitted around the central rod, a tabular metal cap (32) being positioned around the at least one tubular insulating body and crimped thereon; a seal (28; 98) being provided between the at least one tubular insulating body and the cap, said central rod (10), the at least one tubular insulating body (20, 30; 80), the seal (28; 98) and the cap (32) each having along mutual contact regions thereof, surface portions (18, 22; 19; 60, 62; 72, 74 76; 78; 104, 108, 116; 150, 152; 158; 162, 166; 176) possessing complementary reliefs which are discontinuous or irregular in circumferential direction and which are fitted into each other upon the cap being crimped onto the at least one tubular insulating body so as to secure the at least one tubular insulating body from rotation with respect to the cap and the central rod.

2. A sealed electrical terminal according to claim 1, wherein said seal is an insert seal (28) in the form of a cylindrical washer comprising an insulating, rigid but deformable material which is slipped over said rod, two of said tubular insulating bodies (20, 30) being slipped over the central rod from opposite ends thereof until facing surfaces (70) of said bodies come into contact with lateral faces (63) of the insert seal (28), said complementary reliefs (60; 19; 68; 72, 76, 78) being formed on walls of the two tubular insulating bodies (20, 30) of the central rod (10) and of the cap (32) which are in contact with the insert seal, whereby the material of the insert seal (28) is conducted into said reliefs upon the reliefs being compressed laterally through axial crimping forces which are applied thereto by said two tubular insulating bodies.

3. A sealed electrical terminal according to claim 2, wherein said complementary reliefs comprise circularly arcuate notches (60) formed in an inner wall portion of the cap (32) which is in contact with a cylindrical wall of the insert seal (28).

4. A sealed electrical terminal according to claim 3, wherein said complementary reliefs comprise a knurling (68) formed in a region of the cap (32) which is in contact with the cylindrical wall of the insert seal (28), said knurling being at the same level as a lower surface of the cap so as not to impede the introduction of the tubular insulating bodies and of the insert seal.

5. A sealed electrical terminal according to claim 4, wherein the knurling (68) is produced by initially forming an annular recess in said region of the cap and then knurling the bottom of the recess, the depth of the recess being selected such that subsequently the knurling (68) is at the same level as the remainder of the inner wall of the cap.

6. A sealed electrical terminal according to claim 2, wherein said relief (72) is formed on an end face (70) of the at least one tubular insulating body which is in contact with the insert seal, said relief being a recess (72) selectively having a noncircular profile, polygonal, triangular, square or hexagonal profile, a projection having a noncircular profile or projecting teeth (76).

7. A sealed electrical terminal according to claim 1, comprising a single tubular insulating body (80) which has first and second end portions (88, 90) and a widened central cylindrical portion (92) supporting an annular seal (98), wherein:

between the central portion (92) and the second end portion (90) there is formed a cylindrical bearing surface (100) having a diameter of a size between the diameter of the central portion and the diameter of the second end portion;

the bearing surface (100) includes one or more recesses (102; 106), each partially housing a locking component (104; 108) having a part projecting out of the recess without being level with the cylindrical wall of the central portion (92);

the cap includes a stepped inner profile complementary with the profile of the central portion (92) and of the bearing surface (100), and having a first bore (110) of a diameter which is approximately equal to the diameter of the central portion (92), a second bore (112) of a diameter which is approximately equal to the diameter of the bearing surface (100), and a third bore (114) of a diameter which is approximately equal to the diameter of the end portion (90); and the second bore (112) having U-shaped longitudinal notches (116) for housing the projecting parts of the locking components.

8. A sealed electrical terminal according to claim 7, wherein the housing comprises hemispherical holes (102) and the locking components comprise balls (104).

9. A sealed electrical terminal according to claim 7, wherein the housing comprise U-shaped longitudinal notches (106) and the locking components comprise keys (108).

10. A sealed electrical terminal according to claim 1, wherein the at least one tubular insulating body is rotationally anchored to the central rod by forming reliefs on an inner wall of the at least one tubular insulating body (20, 30), in the form of longitudinal grooves (76) which are optionally filled with an adhesive to cause the at least one tubular insulating body to adhere to the rod (10).

11. A sealed electrical terminal according to claim 1, wherein the at least one tubular insulating body is rotationally anchored to the central rod by producing a knurling (66) on the rod (10) which is optionally filled with an adhesive.

12. A sealed electrical terminal according to claim 1, wherein an anchoring with regard to rotation and axial movement of the metal rod (10) to the at least one tubular insulating body (20) is provided by at least one removable linking component (150, 152, 158; 162, 164, 166; 176) having a portion which is inserted into a housing (154, 156; 160; 170, 172, 174; 178) formed in the metal rod, and a portion which rod is inserted into at least one axial housing (22) formed in an inner wall of the at least one tubular insulating body.

13. A sealed electrical terminal according to claim 12, wherein the metal rod (10) is smooth-surface, free of knurling, and is fitted into the at least one insulating body with a zero tolerance gap (27).

14. A sealed electrical terminal according to claim 12 or 13, comprising linking components selectively in the form of two diametrically opposed liking components, selectively in the form of two diametrically opposed linking components on the metal rod, three linking components arranged at 120° one with respect to another, or four linking components arranged at 90° one with respect to each other.

15. A sealed electrical terminal according to claim 12, wherein each said linking component comprises a ball (150, 152), with the corresponding housing (154, 156) in the metal rod being of a hemispherical shape, and with the housing (22) formed in the at least one tubular insulating body being of semicylindrical shape.

16. A sealed electrical terminal according to claim 12, wherein each lining component comprises a pin (158; 162, 164, 166).

17. A sealed electrical terminal according to claim 15, wherein each said pin (162, 164, 166) has a length which is less than the radius of the central rod, and the corresponding housing in the metal rod is a blind hole of a depth less than the length of the pin such that a portion of the length of the pin projects from the blind hole.

18. A sealed electrical terminal according to claim 15, wherein the pin (158) has a length greater than the diameter of the metal rod and is hosed in a through-hole (160) diametrically extending through the metal rod, the pin having two ends projecting from respectively either side of the metal rod and penetrating into two diametrically opposed axial housings formed in an inner wall of the at last one tubular insulating body.

19. A sealed electrical terminal according to claim 12, wherein the anchoring is produced by at least one rectangular or cylindrical key (176) which is partially inserted into a longitudinal slot (178) formed in the surface of the metal rod and partially inserted into an axial slot formed in an inner wall of the at least one tubular insulating body.

* * * * *